(12) United States Patent
Lee et al.

(10) Patent No.: US 6,965,689 B2
(45) Date of Patent: Nov. 15, 2005

(54) IMAGE BASED VOLUMETRIC MEASURING DEVICE

(76) Inventors: Thomas Eliott Lee, 10431 Westacres Dr., Cupertino, CA (US) 95014; Inchan Choi, 1449 Yale Ct., Naperville, IL (US) 60565; Byoung In Suh, 8 Hamilton La., Oakbrook, IL (US) 60521

( * ) Notice: Subject to any disclaimer, the term of this patent is extended or adjusted under 35 U.S.C. 154(b) by 519 days.

(21) Appl. No.: 09/827,277

(22) Filed: Apr. 5, 2001

(65) Prior Publication Data

US 2002/0180865 A1 Dec. 5, 2002

(51) Int. Cl.$^7$ .................................................. G06K 9/00
(52) U.S. Cl. ...................... 382/154; 382/108; 382/199; 382/286; 106/35
(58) Field of Search .............................. 382/100, 108, 382/107, 296, 286, 199, 154, 192, 237, 285; 206/220, 221, 368, 63.5, 501; 220/221; 106/35; 523/113; 102/202.5

(56) References Cited

U.S. PATENT DOCUMENTS

| | | | | | |
|---|---|---|---|---|---|
| 3,932,923 | A | * | 1/1976 | DiMatteo | ................. 29/407.05 |
| 5,062,127 | A | * | 10/1991 | Sayama et al. | ............... 378/45 |
| 5,233,518 | A | * | 8/1993 | King et al. | .................... 378/14 |
| 5,592,563 | A | * | 1/1997 | Zahavi | ........................ 382/154 |
| 5,676,830 | A | * | 10/1997 | Janik et al. | .............. 210/198.2 |
| 5,934,288 | A | * | 8/1999 | Avila et al. | ................. 600/443 |
| 6,184,339 | B1 | * | 2/2001 | Stansbury et al. | .......... 528/407 |
| 6,535,623 | B1 | * | 3/2003 | Tannenbaum et al. | ...... 382/128 |

OTHER PUBLICATIONS

Lee, T.E., et al., Measurement of Volumetric Change Using Video Imaging, American Association for Dental Research, 1998.

* cited by examiner

*Primary Examiner*—Bhavesh M. Mehta
*Assistant Examiner*—Sheela Chawan
(74) *Attorney, Agent, or Firm*—Ice Miller (57) ABSTRACT

A measuring device for calculating sample volumes and changes in sample volumes is disclosed. The device includes a rotatable platform upon which the sample is placed and rotated in increments with an image of the sample being recorded at each rotational position to which the sample is rotated. The recorded images are digitized and outlined such that the outline can be divided into a plurality of parallel slices. The volume of each slice is calculated by calculating the volume of each portion of the slice represented by each image. The portions are then summed to provide the volume of each slice with the volume of each slice then being summed to provide the volume of the total sample. The device further includes a display apparatus to enable an operator to not only view before and after calculated volumes, but to be provided with a graphical display of the shape of the sample both before and after an event which changes the volume of the sample.

46 Claims, 4 Drawing Sheets

IMAGE BASED VOLUMETRIC MEASURING DEVICE

FIELD OF THE INVENTION

The invention generally relates to measuring devices and, more particularly, relates to devices and methods for measuring sample volumes and changes in sample volumes.

BACKGROUND OF THE INVENTION

Many fields use adhesives, glues, and plastics which must be cured before setting. The curing process often results in shrinkage of the material, which in turn causes stresses to arise within the material and the substrate to which the material is bonded.

For example, in the field of dentistry, dental restoration procedures often require various resin-containing materials, such as composites and adhesives, to be filled into a tooth cavity or area being repaired. The material is then cured using a hand tool which emits light through a bundle of optic fibers to result in a focused light output. The material is cured by polymerization resulting from the light exposure.

However, shrinkage of the restorative material used to fill the cavity can create stresses which may lead to premature failure or otherwise necessitate repair. Development of adhesives and polymers which undergo less volumetric change, or development of curing methods which relieve stress, are therefore advantageous in the development of new storage materials. A key to the development of such materials is the ability to measure small changes in volume. Present methods used to measure volumetric changes include water or mercury dilatometers, or methods which measure a change in one dimension and try to deduce volumetric change therefrom.

Water and mercury dilatometry operate by measuring the amount of water or mercury which is displaced by the sample volume within a sample chamber. The volume of mercury or water is determined by weighing the displaced water or mercury. The accuracy of these techniques and instruments require precisely controlling temperature, precisely controlling the chamber volume from which the water or mercury are displaced, and precisely weighing the displaced mercury or water. Errors can be introduced into the measuring process at any or all of the steps. In addition, such instruments are time consuming to use and, due to the many steps required to obtain a measurement, can suffer from operator bias. Sample interactions between the displacement fluid and the sample can also affect accuracy. For example, polymers used for restorative dentistry may absorb water and may expand as a result. Also, due to the time consuming nature of each measurement, the number of measurements which can be practically made by a researcher is limited.

Controlling the manner in which the curing process is conducted may also relieve stresses within the material boundaries. For example, the manner in which light is applied to light-cured restorative materials in dentistry may relieve the stress between the adhesive and the tooth. Testing this hypothesis, however, requires an instrument which can reveal not only the amount of volume change, but also the location or locations at which the sample volume has changed. It would also be helpful to know the portion of the sample which changed volume first.

SUMMARY OF THE INVENTION

In accordance with one aspect of the invention, a measuring device is provided which comprises a camera adapted to generate images of an item being measured, and a processor operatively associated with the camera and adapted to calculate the volume of the item based on the generated images.

In accordance with another aspect of the invention, a volumetric measuring device is provided which comprises a platform, a camera, a processor, and a display device. The platform is adapted to support an item to be measured and is rotatable in increments across a 360° range of rotation. The camera is positioned proximate the platform and is adapted to generate images of the item. The processor is operatively associated with the camera and is adapted to identify outlines of the item in each image and calculate the volume of the item. The volume is calculated by calculating a volume associated with each image and adding the volumes associated with each of the images. The display device is operatively associated with the processor and is adapted to display the information associated with the calculated volume.

In accordance with another aspect of the invention, a method of calculating a volume of a sample is provided comprising the steps of recording camera images of the sample from N angles where the N angles total 360° degrees, digitizing the images, identifying an outline of the sample, dividing the image into a plurality of parallel slices, tabulating the height and width of each slice, calculating the volume associated with each slice, and summing the calculated volumes associated with each slice for each of the N images.

According to another aspect of the invention, a method of calculating a volume of a sample is provided comprising the steps of recording a camera image of the sample, tabulating a volume associated with the image, and calculating the volume of the sample based on the tabulated volume associated with the image.

These and other aspects and features of the invention will become more apparent from the following detailed description when taken in conjunction with the accompanying drawings.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

Figure 1:
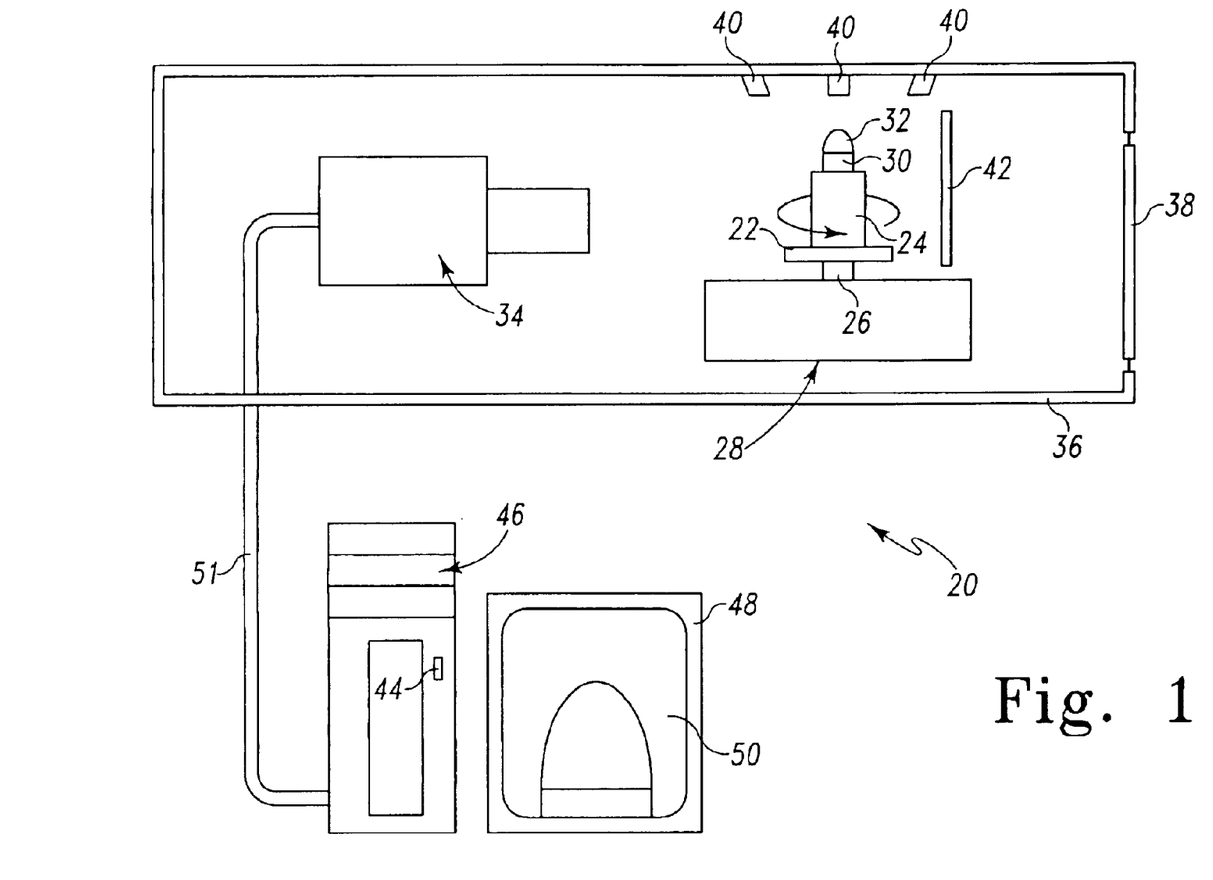
FIG. 1 is a schematic representation of a measuring device constructed in accordance with the teachings of the invention.
Figure 2:
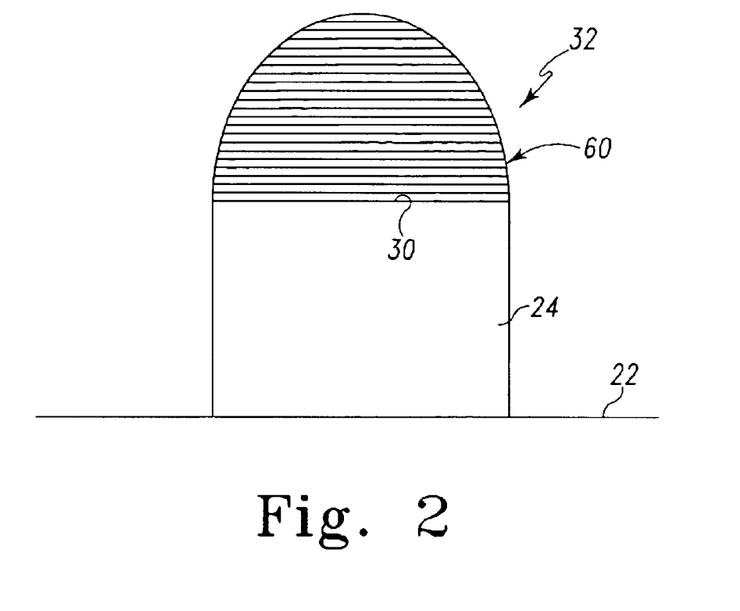
FIG. 2 is a schematic representation of a sample divided into a plurality of slices in accordance with the teachings of the invention.

Referring now to the drawings, and with specific reference to FIG. 1, a measuring device or system constructed in accordance with the teachings of the invention is generally referred to by reference numeral 20. While the device 20 will be described below for use in conjunction with measuring volumetric reductions associated with dental restorative materials upon being cured, it is to be understood that the teachings of the invention can be used in connection with any other type of function wherein accurate measurement of volumes is desirable. Such other functions include, but are not limited to, medical, research, industrial, and construction activities wherein materials subject to shrinkages or other changes in volume may affect function performance. Moreover, it is to be understood that while the equations and steps discussed herein may be calculated and performed manually, they are preferably encoded into software and calculated by microprocessor.

Referring again to FIG. 1, the device 20 is shown to include a platform 22 upon which a pedestal 24 is positioned. The platform 22 is mounted to a shaft 26 extending from a motor 28. The motor 28 may be provided in the form of a stepper motor, wherein the shaft 26 is adapted to move in uniform increments, or may be provided in the form of a motor and drive arrangement adapted to move the shaft 26 in incremental movements. The motor 28 may also be provided in the form of a servo-motor. One suitable example of the motor 28 is a stepper motor capable of making 3200 micro-steps per shaft revolution.

The pedestal 24 provides a surface 30 upon which a sample 32 may be positioned for measurement. As indicated above, the sample 32 may be provided in the form of a dental restorative material. Positioned proximate the sample 32 is a camera 34, which may be provided in the form of a charge coupled device (CCD) camera. The camera 34 is adapted to record images of the sample 32 at each location to which the shaft 26 and pedestal 24 are rotated. More specifically, if the shaft 26 is adapted to rotate in N increments, which in total sum to 360°, the camera 34 will accordingly record N images. The value of N is preferably adjustable in the software of the system 20 to increase or decrease the accuracy of the calculations as desired. For example, if N is set to four, an image will be recorded at every ninety degrees of revolution. This will allow quick calculations and measurements but, unless the change in volume is isotropic, will not be as precise as calculations performed wherein N is set to a greater number and a corresponding greater number of images are recorded.

Preferably, the sample 32 is provided within an enclosure or isolation chamber 36 having an operable door 38. One or more light sources 40 are preferably provided within the isolation chamber 36. A black or otherwise opaque background 42 are also provided within the isolation chamber 36. The lights 40 are preferably positioned so as to illuminate the sample 32 without illuminating the background 42.

The camera 34 is operatively associated with a processor 44. The processor 44 may be provided as a part of a personal computer 46 or any other type of suitable electronic processing component. An operator interface device 48 is operatively associated with the processor 44 and preferably includes a display screen 50.

Figure 3:
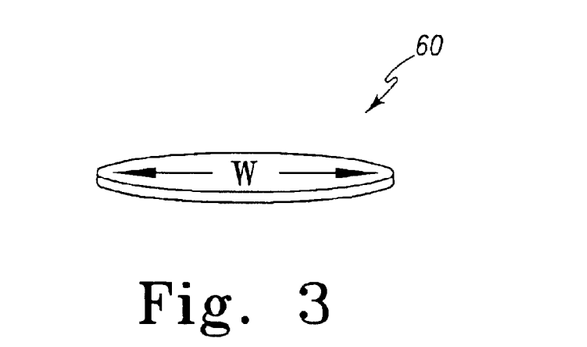
FIG. 3 is an isometric view of a single slice according to FIG. 2.
Figure 4:
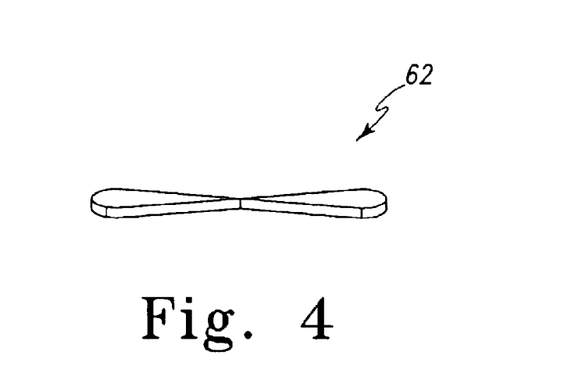
FIG. 4 is an isometric view of a portion of the slice of FIG. 3 which may be generated from a single image taken by a measuring device constructed in accordance with the teachings of the invention.
Figure 5:
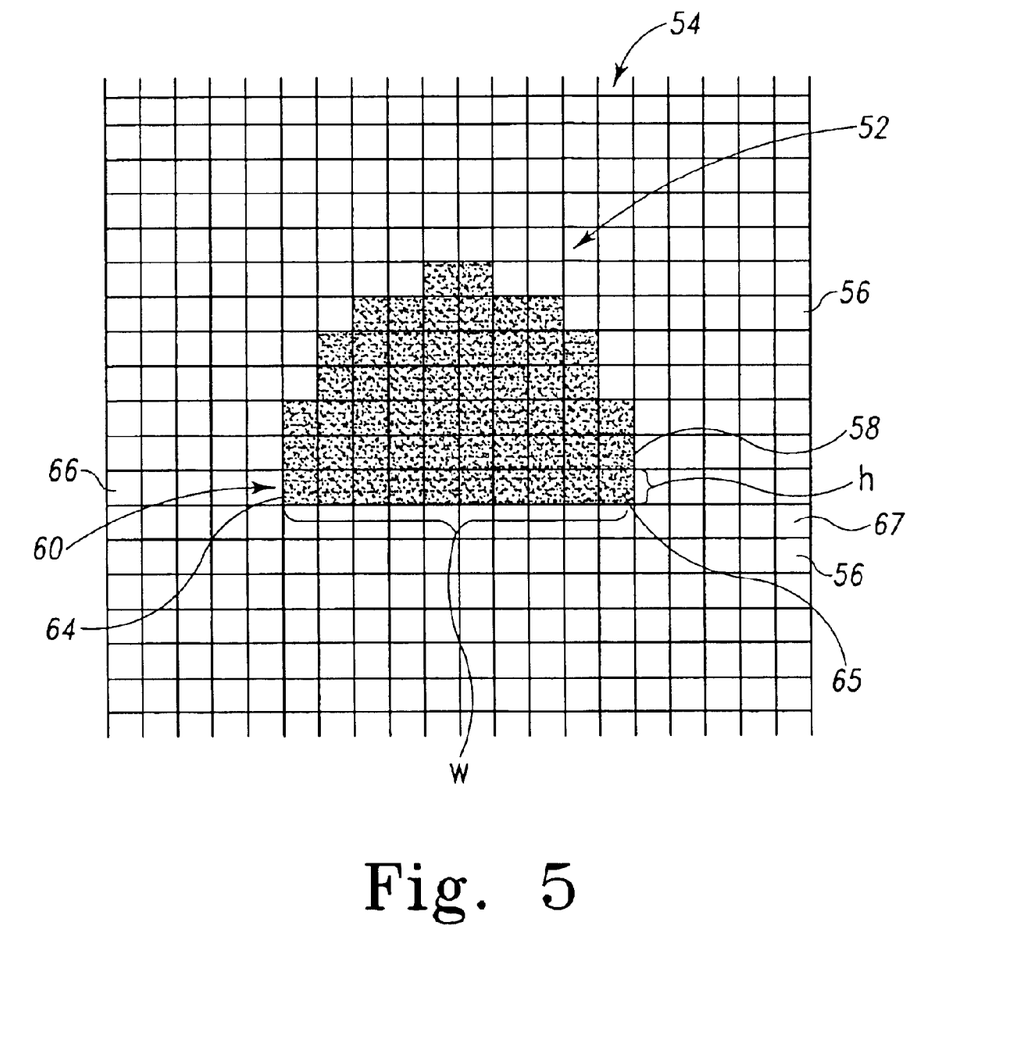
FIG. 5 is a sample outline depicted on a partial pixel grid according to the teachings of the invention.

Referring now to FIGS. 2–5, the sample 32 is depicted in further detail. The processor 44 receives images 51 from the camera 34, digitizes the data associated with each image 51, and reconstructs the sample 32 into a digitized image 52 displayable upon a pixel grid 54 as shown in FIG. 5. Since the sample 32 is recorded against a black backdrop 42, the intensity of each pixel 56 associated with the sample 32 is identifiable upon the pixel grid 54 by the processor 44. As will be described in further detail herein, this may be accomplished by comparing the intensity of each pixel to a threshold intensity value. The pixel grid 54 may be of various size, such as 640 by 480, or larger, with larger grids 54 necessarily resulting in greater resolution.

In order to calculate the volume of the sample 32, a first step is to divide the outline 58 of the image into a plurality of slices 60. In the depicted embodiment, the slices are provided horizontally and each has a height, h, equal to one pixel. Alternatively, the slices 60 may be provided vertically, wherein each slice has a width of one pixel, or another known, constant value.

As shown best in FIG. 3, each slice 60, in the depicted embodiment, is substantially cylindrical in shape. However, as can be seen from FIG. 4, the portion of each slice or disc 60 which is reconstructed for each image taken by the camera 34 is only a small percentage of the total disc volume. Accordingly, to calculate the volume of a single slice 60, the volume of each portion 62 must first be calculated, and added to the volumes of each additional portion 62 comprising the entire slice 60. According to a multiple view embodiment of the invention, i.e., wherein N is greater than one, the volume of each portion 62 must be calculated for each slice 60 comprising the entire sample 32, and then the slice volumes are added together to generate the volume for the entire sample 32. According to a single view embodiment discussed in further detail herein, the volume for the entire sample 32 can be based on a single view, i.e., N=1, based on the premise that the sample 32 is symmetrical.

Referring now to FIG. 5, a portion of the pixel grid 54 is shown, with an outline 58 resulting from a single image depicted as well. Before the volume of the sample 32 can be calculated, it is first necessary to account for the volume represented by the pedestal 24. This can be accomplished in at least two ways. According to a first system, the volume of the pedestal can be calculated before the sample is measured, with the pedestal volume being stored in memory. This requires a calibration step prior to measuring the sample 32 and also requires that the pedestal 24 be cleaned before each use.

An alternative requires that the user identify on the pixel grid the point at which the pedestal 24 stops and the sample 32 begins. This may be accomplished in software by providing an analysis box or icon which may be manipulated on screen by the user. For example, the user may use an input device, such as a mouse, tractor ball, or the like, to display an analysis box on screen. Such an analysis box may be adjustable in size and shape and enable the user to drag the analysis box directly over the sample 32, and only the sample 32. Volume calculations can then be performed for only the image within the analysis box.

Once the pedestal 24 is accounted for, the volume of the image may be calculated. The height of each slice 60 may, as indicated above, be maintained at a constant of one pixel. In order to calculate the width of each slice 60, the number of pixels 56 comprising the slice 60 must be calculated. This may be accomplished in a number of different ways. One way in which the width can be calculated is by counting the number of pixels 56 above a predetermined threshold of light intensity. Since the backdrop 42 is black or otherwise opaque, the processor 44 can compare the intensity of each pixel 56 within a given slice 60 to the predetermined threshold and if the intensity is greater than the threshold, add the pixel to the total width of the slice 60. In the depicted example, the slice 60 has a width of ten pixels. The threshold value is preferably adjustable, but should be set at a level to ensure all viable pixels are counted, while minimizing the effect of noise or other extraneous signals.

Alternatively, the width of the slice 60 can be calculated by identifying the left most pixel 64, the right most pixel 65 and using the following equation:

$$w_m = (x_{mR} - w_{mL}) + 1,$$

wherein $w_M$ represents the width of the slice, $x_{mR}$ represents the right most pixel, and $x_{mL}$ represents the left most pixel. The left most pixel 64 of the image may be identified by the processor 44 by starting with the left most side 66 of the pixel grid 54 and moving right until, in comparing the intensity of each pixel 56 to the threshold value, a pixel having an intensity above the threshold value is identified. The right most pixel 65 can then be similarly identified by starting from the right most side 67 of the pixel grid 54 and moving left. This method has the benefit of ensuring that dark regions on the sample 32 are not viewed by the processor 44 as below the threshold value and thus not counted.

Once the height and width of each slice 60 are determined, the total volume of the sample 32 can be calculated. The volume of each slice 60 can be calculated using the following equation:

$$v_s = h \times \Pi \times (W_{mn}/2)^2.$$

However, as stated above, each slice 60 is divided into a number of portions 62, wherein the number of portions comprising each slice corresponds to the number of images recorded by the camera 34. If N represents the number of images of the sample 32 for each 360° revolution of the sample 32, the volume of N portions must be calculated. The following equation may be used to calculate the volume of each portion 62:

$$v_p = 1/N \times h \times \Pi \times (W_{mn}/2)^2.$$

Once the volume of each portion 62 is known, the volume of the entire sample 32 can be calculated by summing the portions 62 comprising each slice 60, and then summing the volumes of each slice 60. More specifically, the following equation can be used to calculate the total sample volume:

$$v_t = \sum_{n=1}^{N} \sum_{m=1}^{M} 1/N \times h \times \prod \times (W_{mn}/2)^2.$$

Since a sample may exhibit a different degree of reflectivity, both before and after curing, the system 20 further enables an intensity slope to be calculated and factored into subsequent calculations. The intensity slope may be calculated using the equation:

$$S = \sum_{m=1}^{M} (p(m, x_{lt} + 1) - p(m, x_{lt}) + p(m, x_{rt} - 1) - p(m, x_{rt}))/2,$$

where S is the intensity slope, $x_{rt}$ is the first x position from the left side of the pixel grid 54 where the pixel intensity is above the threshold value, and $x_{rt}$ is the first x position from the right side of the pixel grid 54 where the pixel intensity is above the threshold value. A change in the intensity slope can then be calculated for the sample 32 before and after curing and added to subsequent calculations.

The teachings of the invention, can be used to construct a device 20 adapted to calculate not only the volume of a single sample 32, but the volumes for the sample 32 both before and after a change in volume. For example, if the sample 32 is a dental restorative material, adapted to be cured, a light probe may be introduced to cure the sample 32 after the sample 32, in its cured state, is measured. The sample 32 accordingly will decrease in volume. The processor 44 can then calculate the change in volume before and after the curing process using the following equation:

$$\Delta \% v_t = 100 \times (v_1 - v_2)/v_1,$$

where $v_1$ is the volume before the curing process, and $v_2$ is the volume after the change in volume.

For the situation, alluded to above, where the change in volume occurs by the same amount in all the dimensions of the sample (symmetrical reduction along all three x, y, z coordinates), the percent change in volume can be accurately measured from volumetric reconstructions which are preformed from a single view (N=1). This is because in this special case, the measured volumes (reconstructed from a single view), which are defined herein as $v_{m1}$ (volume measured before the change in volume) and $v_{m2}$ (volume measured after the change in volume), are related to the true volume by the equations:

$$v_{m1} = k \times v1, \text{ and}$$

$$v_{m2} = k \times v2,$$

where k is a constant. If the measured volumes $v_{m1}$ and $v_{m2}$ are substituted into the equation for percent change, the following equations are obtained:

$$\Delta \% v = 100 \times (v_{m1} - v_{m2})/v_{m1}, \text{ which reduces to}$$

$$\Delta \% v = 100 \times (k \times v_1 - k \times v_2)/(k \times v_1), \text{ which reduces to}$$

$$\Delta \% v = 100 \times (v_1 - v_2)/v_1.$$

It will be noted that the above equation is the same as that obtained using the true volumes $v_1$ and $v_2$ disclosed earlier. Measuring the change in volume from a single view has the advantages that change in volume can be measured faster, and methods for displaying the change in volume are easier for the operator to interpret.

Once the volume and change in volume have been calculated, the device 20 is able to display the calculated information to the user using the operator interface device 48. Before and after graphical representations of the sample 32 can be displayed on the display screen 50 in multiple formats, including, but not limited to, simultaneously, or repeatably in alternating fashion. The outlines 58 generated for each sample 32 both before and after the curing event can be used to generate two or three-dimensional images of the sample to provide the operator with useful information not only as to the total volume of the reduction, but the location of the changes as well. The frequency with which the images are alternated can be modified in the software as desired.

Another option for displaying the change in volume utilizes a difference image with pixels $j_{xy}$ using the formula:

$$j_{xy} = \frac{I_{hm}}{I_m}(k_{xy} - i_{xy}) + I_{hm},$$

where $I_m$ is the maximum pixel intensity, $I_{hm}$ is half the maximum pixel intensity, $i_{xy}$ are pixel intensities before the change in volume, and $k_{xy}$ are pixel intensities after the change in volume. In other words, the difference image provides a pixel for pixel comparison, or change in state for every pixel of the image.

In operation, the device 20 can be used to calculate the volume of a sample 32, as well as the change in volume in the sample 32. The device 20 can also represent the change in volume to an operator using a display screen 50. Such representation can be numerical, graphical, in the form of two or three dimensional images, or the like.

Figure 6:
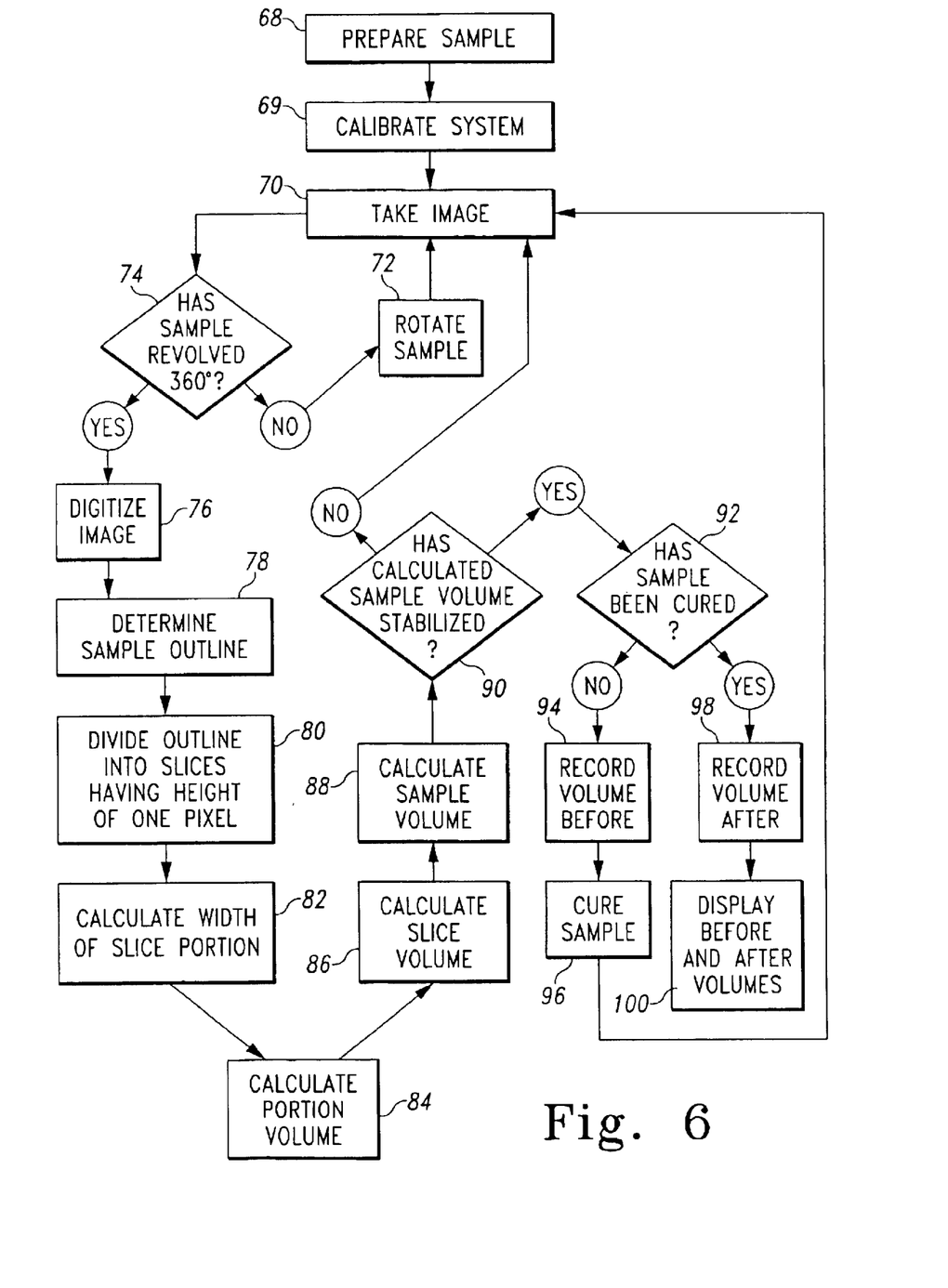
FIG. 6 is a flow chart depicting a series of steps which may be taken by a measuring device constructed in accordance with the teachings of the invention.

Referring now to FIG. 6, a sample sequence of steps which may be taken by the device 20 are depicted. It is to be understood that the depicted sequence is by way of example only, and that other possible step sequences are possible and within the scope of the invention. As shown in FIG. 6, a first step 68 may be to prepare a light curable sample polymer 32. For example, approximately 20 microliters of a polymer may be rolled into a ball and placed onto the pedestal 24. The door 38 of the isolation chamber 36 is then closed. A second step 69 then requires that the volume of the pedestal 24 be accounted for using, for example, one of the above calibration or analysis box alternatives.

In a step 70, the camera 34 is used to generate an image from a first side of the sample 32. If the multiple view option is selected, the sample is then rotated N times as indicated by step 72, with a camera image being taken at each increment of rotation, until the sample 32 has rotated 360°, as indicated by a step 74.

After images have been taken at each increment of revolution, the images are digitized by the processor 44 as indicated by a step 76. The outline 58 of the sample 32 is determined in a step 78 by comparing pixel intensities to a threshold intensity value. The outline 58 is then divided into a plurality of slices 60 having a constant dimension in one direction, for example height, as indicated by step 80. The width of each slice portion 62 is then calculated in a step 82, with the portion volume being calculated in a step 84. The entire slice volume is then calculated in a step 86. The sample volume is then calculated by summing the calculated slice volumes as indicated by a 88. The processor 44 employs the equations identified above to perform the steps 82–88.

Before the calculated values can be assured of being reliable, the sample 32 must be allowed to settle upon the pedestal 24. This may require several minutes while the sample and the temperature within the chamber 36 reach equilibrium. During this time, the sample volume may be continuously reconstructed and monitored as indicated above, but the calculated volume is only utilized once it has been determined that the sample volume has stabilized as indicated in a step 90. A number of different tests can be utilized to determine whether the sample volume is stabilized with one such test being whether the calculated volume has been calculated to be the same value for a sufficiently high number, e.g., three or more, of times.

If the sample volume is not stabilized, the device 20 returns to the image taking step 70 to repeat the process until the sample volume has stabilized. If the sample volume has stabilized, the device 20 determines whether the sample 32 has yet been cured as indicated in a step 92. If the sample 32 has not yet been cured, the calculated volume is recorded as indicated in a step 94 and the sample is then cured as indicated in a step 96. If the sample has already been cured, the calculated volume is recorded as indicated by a step 98. The calculated before and after volumes can then be displayed as indicated by a step 100. The determination whether the sample 32 has been cured can be performed by the operator, or can be prompted by the processor 44, as by displaying a suitable message on the operator interface device 48.

From the foregoing, it will be appreciated that the invention provides a measuring device to calculate the volume of a sample in a quick, repeatable, and accurate manner without exposing the sample to interactions with testing materials. The device also provides a method by which before and after volumes can be not only calculated, but displayed to a user in graphical and/or numerical format.

What is claimed is:

1. A comparative measuring device, comprising:
   a camera adapted to generate a first set of images of an item being measured before an event, and generate a second set of images of the item after the event; and
   a processor operatively associated with the camera and adapted to calculate a first total volume of the item based on the first set of images and a second total volume of the item based on the second set of images, and output a first value for the first calculated total volume and a second value for the second calculated volume, wherein the processor is adapted to identify a first outline of the item using the first set of images and a second outline of the item using the second set of images and divide each outline into a plurality of two dimensional slices, each slice having a first dimension of a constant value and a second dimension of variable value.

2. The measuring device of claim 1, further including a rotatable platform upon which the item is placed and rotated through 360° of rotation, and wherein the camera is adapted to generate a plurality of digital images of the item across 360° of rotation.

3. The measuring device of claim 2, wherein the platform rotates in N steps around 360° of rotation, and wherein the camera generates N images of the item.

4. The measuring device of claim 3, wherein the processor calculates the first and second total volumes of the item using the equation:

$$\text{volume} = \sum_{n=1}^{N} \sum_{m=1}^{M} 1/N \times h \times \prod \times (W_{mn}/2)^2,$$

wherein h equals slice height, w equals slice width, N equals the total number of images, and M equals the total number of slices.

5. The measuring device of claim 2, wherein the rotatable platform is connected to a stepper motor.

6. The measuring device of claim 2, further including an isolation chamber, and wherein the rotatable platform and item are positioned within the isolation chamber.

7. The measuring device of claim 6, further including an opaque background within the isolation chamber.

8. The measuring device of claim 1, further including a display, the display adapted to communicate the first and second calculated total volumes to a user.

9. The measuring device of claim 8, wherein the event results in a change in volume of the item, and wherein the volumes before and after the event are viewable on the display.

10. The measuring device of claim 9, wherein a change in volume between the before and after volumes is displayed utilizing a difference image with pixels $j_{xy}$ with the formula:

$$j_{xy} = \frac{I_{hm}}{I_m}(k_{xy} - ixy) + I_{hm},$$

where $I_m$ represents maximum pixel intensity, $I_{hm}$ represents half of the maximum pixel intensity, $i_{xy}$ represents pixel intensities before the change in volume, and $k_{xy}$ represents pixel intensities after the change in volumes.

11. The measuring device of claim 9, wherein the total volumes before and after the event are displayed as three dimensional representations of the item.

12. The measuring device of claim 11, wherein the total volumes before and after are displayed repeatedly in alternating fashion.

13. The measuring device of claim 9, wherein the event is shrinkage of the item.

14. The measuring device of claim 13, wherein the item is a dental material, and the shrinkage occurs as a result of polymerization due to exposure of the item to light.

15. The measuring device of claim 1, wherein the slices are horizontal, each slice has a height of one pixel and a width calculated by the processor by counting the number of pixels in each slice above a threshold level of intensity.

16. The measuring device of claim 1, wherein the slices are horizontal, each slice has a height of one pixel, and a width calculated by identifying the left most and right most pixels in the slice above a threshold level of intensity, and using the following equation:

$$W_m = (x_{mR} - x_{mL}) + 1,$$

wherein $W_m$ represents slice width, $x_{mR}$ represents the right most pixel and $x_{mL}$ represents the left most pixel.

17. The measuring device of claim 1, wherein each slice has a height of one pixel, each pixel has an intensity, and an intensity slope is calculated for the sample.

18. A comparative volumetric measuring device, comprising:
   a platform adapted to support an item to be measured and rotate the item in N increments across a 360° range of rotation;
   a camera positioned proximate the platform and adapted to generate a first set of N images of the item and a second set of N images of the item subsequent to an event that may cause a change in volume of the item;
   a processor operatively associated with the camera and adapted to identify outlines of the item in each image, the processor being further adapted to calculate a first total volume of the item by calculating a first volume associated with each image and adding the volumes associated with each of the first set of N images, calculate a second total volume of the item by adding the volumes associated with each of the second set of N images, and output a value for the total volume; and
   a display device operatively associated with the processor and adapted to display information associated with the calculated first and second total volumes.

19. The volumetric measuring device of claim 18, wherein the camera is a charge-coupled device.

20. The volumetric measuring device of claim 18, wherein the platform is connected to a stepper motor.

21. The volumetric measuring device of claim 18, wherein the display device is a monitor adapted to display three-dimensional images representative of the item.

22. The volumetric measuring device of claim 18, further including an isolation chamber, the platform and camera being within the isolation chamber.

23. The volumetric measuring device of claim 22, further including an opaque background within the isolation chamber.

24. The volumetric measuring device of claim 23, further including at least one light source, the at least one light source being adapted to illuminate the item and not the background.

25. A method of calculating a total volume of a sample comprising the steps of:
   (a) recording a camera image of the sample;
   (b) tabulating a volume associated with the image by digitizing the camera image, dividing the digitized image into a series of slices, determining the width and height of each slice in terms of pixels, and calculating a slice volume based on the width and height before performing the tabulating step;
   (c) calculating the total volume of the sample based on the tabulated volume associated with the image to determine a value for the total volume of the sample,
   (d) subjecting the sample to an event that may change the total volume of the sample, and
   (e) repeating steps (a) through (c).

26. The method of calculating a total volume of a the sample of claim 25, wherein each pixel has an intensity, and an intensity slope is calculated for the sample.

27. The method of calculating a total volume of the sample of claim 25, wherein each pixel has an intensity and wherein at least one of the height and width are determined by comparing each pixel intensity to a threshold level of intensity.

28. A measuring device, comprising:
   a camera adapted to generate images of an item being measured;
   a processor operatively associated with the camera and adapted to calculate the total volume of the item based on the images, the processor adapted to identify an outline of the item and divide the outline into a plurality of two dimensional slices, each slice having a first dimension of a constant value and a second dimension of variable value; and
   a rotatable platform upon which the item is placed and rotated through 360° of rotation, wherein the camera is adapted to generate a plurality of digital images of the item across 360° of rotation the platform rotates in N steps around 360° of rotation, and the camera generates N images of the item
   wherein the processor calculates the total volume of the item using the equation:

$$\text{volume} = \sum_{n=1}^{N} \sum_{m=1}^{M} 1/N \times h \times \prod \times (W_{mn}/2)^2,$$

wherein h equals slice height, w equals slice width, N equals the total number of images, and M equals the total number of slices.

29. A measuring device, comprising:
   a camera adapted to generate images of an item being measured;
   a processor operatively associated with the camera and adapted to calculate the total volume of the item based on the images; and a display, the display adapted to communicate the calculated volume to a user, wherein the item volume is calculated before and after an event, wherein the volumes before and after the event are viewable on the display, and wherein a change in volume between the before and after volumes is displayed utilizing a difference image with pixels $j_{xy}$ with the formula:

$$j_{xy} = \frac{I_{hm}}{I_m}(k_{xy} - ixy) + I_{hm},$$

where $I_m$ represents maximum pixel intensity, $I_{hm}$ represents half of the maximum pixel intensity, $i_{xy}$ represents pixel intensities before the change in volume, and $k_{xy}$ represents pixel intensities after the change in volume.

30. A measuring device, comprising:

a camera adapted to generate images of an item being measured; and a processor operatively associated with the camera and adapted to calculate the volume of the item based on the images, the processor adapted to identify an outline of the item and divide the outline into a plurality of two dimensional slices, each slice having a first dimension of a constant value and a second dimension of variable value, wherein the slices are horizontal, each slice has a height of one pixel, and a width calculated by identifying the left most and right most pixels in the slice above a threshold level of intensity, and using the following equation:

$$W_m = (x_{mR} - x_{mL}) + 1,$$

wherein $W_m$ represents slice width, $x_{mR}$ represents the right most and $x_{mL}$ represents the left most pixel.

31. A method of calculating the total volume of a sample, comprising the steps of:

recording camera images of the sample from N angles, the N angles totaling 360°;

digitizing the images on a pixel grid;

identifying an outline of the sample by identifying the pixels within the grid above a predetermined threshold intensity for each image;

dividing the image into a plurality of parallel slices;

tabulating the height and width of each slice by dividing the outline into a plurality of slices wherein each slice has a height of one pixel and counting the number of pixels within each slice above the threshold intensity;

calculating a volume associated with each slice using the equation:

$$v_s = 1/N \times h \times \Pi \times (W_{mn}/2)^2,$$

wherein v represents the volume of the slice portion represented in the view, N represents the total number of images, h represents the height of the slice, and $W_{mn}$ equals the width of the slice; and summing the calculated volumes associated with each slice for each of the N images.

32. The method of claim 31, wherein the summing step is performed using the equation:

$$v_t = \sum_{n=1}^{N} \sum_{m=1}^{M} 1/N \times h \times \prod \times (W_{mn}/2)^2,$$

wherein $v_t$ represents total sample volume and M represents the number of slices in each image.

33. A method of calculating the total volume of a sample, comprising the steps of:

recording camera images of the sample from N angles, the N angles totaling 360°;

digitizing the images on a pixel grid;

identifying an outline of the sample by identifying the pixels within the grid above a predetermined threshold intensity for each image;

dividing the image into a plurality of parallel slices;

tabulating the height and width of each slice;

calculating a volume associated with each slice;

summing the calculated volumes associated with each slice for each of the N images;

changing the sample volume;

repeating the recording, digitizing, identifying, dividing, tabulating, calculating and summing steps; and determining a percent change in sample volume before and after the changing step using the equation:

$$\Delta\% v_t = 100 \times (v_1 - v_2)/v_1,$$

wherein $v_1$ represents total sample volume before the changing step, and $v_2$ represents total sample volume after the changing step.

34. A method of calculating the volume of a sample, comprising the steps of:

(a) recording camera images of the sample from N angles, the N angles totaling 360°;

(b) digitizing the images on a pixel grid;

(c) identifying an outline of the sample by identifying the pixels within the grid above a predetermined threshold intensity for each image;

(d) dividing the image into a plurality of parallel slices;

(e) tabulating the height and width of each slice;

(f) calculating a volume associated with each slice;

(g) summing the calculated volumes associated with each slice for each of the N images to calculate a value for the total volume of the sample;

(h) subjecting the sample to an event that may change the sample volume; and (i) repeating steps (a) through (g).

35. The method of claim 34, wherein each slice includes a plurality of portions and wherein the method further includes the step of calculating the volume of each slice portion before calculating the volume of each slice.

36. The method of claim 34, wherein the recording step is performed by placing the item on a platform, rotating the platform in N increments, and recording an image at each increment of rotation.

37. The method of claim 34, wherein the height tabulation step is performed by dividing the outline into a plurality of slices wherein each slice has a height of one pixel.

38. The method of claim 37, wherein the width calculation step is performed by counting the number of pixels within each slice above the threshold intensity.

39. The method of claim 38, wherein the calculating the volume step is performed using the equation:

$$v_s = 1/N \times h \times \Pi \times (W_{mn}/2)^2,$$

wherein v represents the volume of the slice portion represented in the view, N represents the total number of images, h represents the height of the slice, and $W_{mn}$ equals the width of the slice.

40. The method of claim 39, wherein the summing step is performed using the equation:

$$v_t = \sum_{n=1}^{N} \sum_{m=1}^{M} 1/N \times h \times \prod \times (W_{mn}/2)^2,$$

wherein $v_t$ represents total sample volume and M represents the number of slices in each image.

41. The method of claim 34, further including the step of determining a percent change in sample volume before and after step (h).

42. The method of claim 41, further including the step of displaying the change in volume on an operator interface device.

43. The method of claim 42, wherein the displaying step is performed by repeatedly displaying before and after images of the sample.

44. The method of claim 42, wherein displaying step is performed by simultaneously displaying before and after images of the sample.

45. The method of claim 41, wherein the determining step is performed using the equation:

$$\Delta\% v_t = 100 \times (v_1 - v_2)/v_1,$$

wherein $v_1$ represents total sample volume before the changing step, and $v_2$ represents total sample volume after the changing step.

46. The method of claim 34, wherein the sample is a dental material and step (h) reduces the sample volume by curing the material upon exposure to light.

* * * * *